3,282,081
GYROSCOPE TESTING SYSTEM
Boris Boskovich, St. Anthony Village, Charles L. Seacord, Minnetonka Village, Minn., assignors to Honeywell Inc., Minneapolis, Minn., a corporation of Delaware
Filed July 30, 1964, Ser. No. 386,308
9 Claims. (Cl. 73—1)

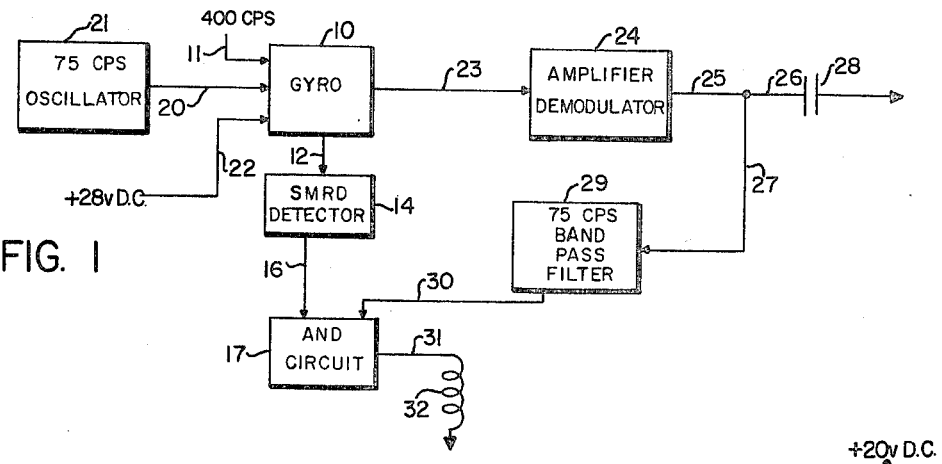
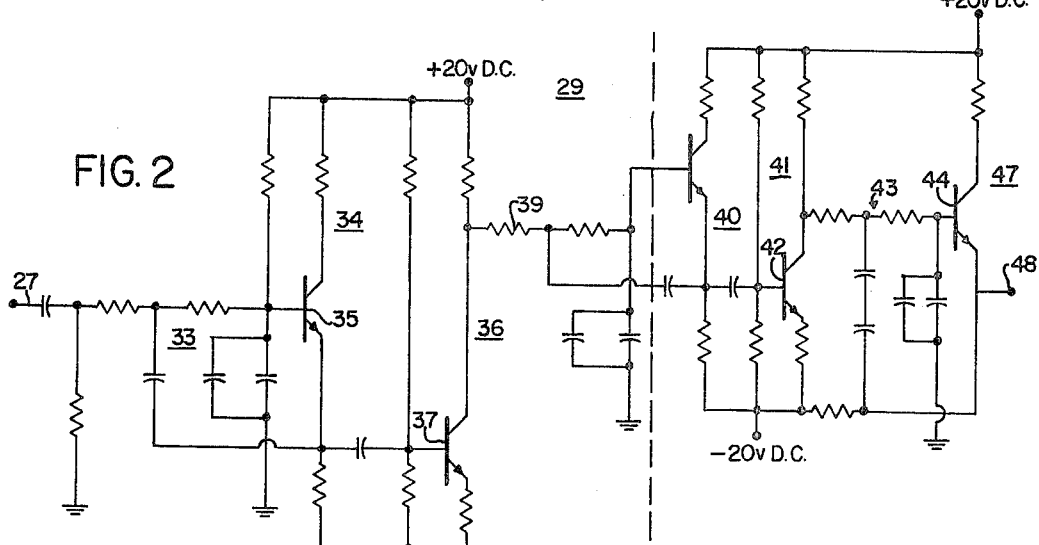
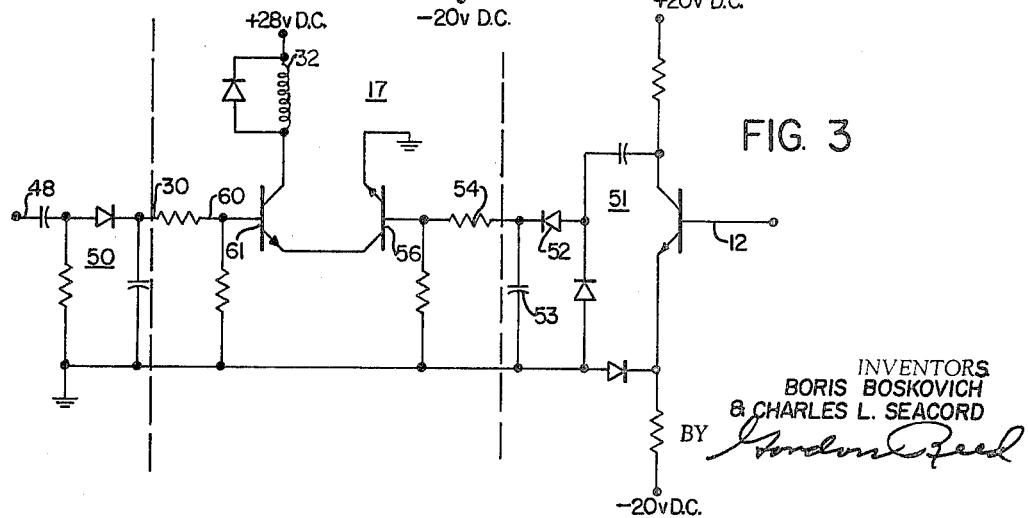
INVENTORS
BORIS BOSKOVICH
& CHARLES L. SEACORD
BY
ATTORNEY United States Patent Office 3,282,081
Patented Nov. 1, 1966

This invention relates to monitoring or testing devices for condition control responsive devices. Such condition responsive device may for example be a gyroscope.

Examples of the type of gyroscope to which the invention may be applied are illustrated by U.S. patents to Jarosh et al., 2,752,791 and Johnson et al. 3,060,752. Such gyroscopes have and electrically driven rotor and an electric signal generator or pick-off. Such gyroscope senses angular velocity and precesses about an axis in response thereto. The rotation of the rotor of the gyroscope provides rigidity thereto and causes precession about an axis normal to the spin axis when there is an angular motion of an aircraft for example about a third axis normal to the spin axis and axis of precession. The precession of the gyroscope is reflected in a signal in the pick-off which is in accordance with the magnitude of the angular rate sensed.

In some instances there may be an "open" in the signal generator or pick-off so that a signal is not transmitted and thus while the rate gyroscope may be precessing due to an angular rate the effect of the precession is not transmitted for control. Additionally, if there is an "open" in the energizing circuit for the gyro rotor, the rotor may be stationary and thus while the gyroscope and craft on which it is mounted may be subject to an angular velocity no precession of the gyroscope results and hence no signal is generated because of the malfunction.

It is therefore an object of the present invention to provide a monitoring system or system for testing while in flight the operational condition of a flight condition sensing device such as a gyroscope and its signal generator.

A further object of the present invention is to provide a system for testing the operational condition of a gyroscope signal generator by causing oscillations in the signal generated thereby.

A further object of the present invention is to provide a system for testing in flight both the operational condition of a gyroscope pick-off or signal generator and the rotational velocity of the gyroscope rotor.

A further object of the present invention is to provide in a gyroscope in-flight monitoring system a utilization device responsive both to the operational condition of the gyroscope pick-off and the rotational condition of the gyroscope rotor.

A further object of the present invention is to provide a system for testing in flight both the operational condition of a single axis gyroscope pick-off by effecting mechanical oscillations about said axis to cause a small selected frequency signal to be generated therein and combining said signal with one due to the rotational velocity of the gyroscope rotor.

The above and further objects of the invention will become more apparent from the following description taken in conjunction with the subjoined drawings disclosing an embodiment thereof.

In the drawings:
FIGURE 1 is a block diagram of the monitoring arrangement applied to a single axis gyroscope; and
FIGURES 2 and 3 comprise an electrical schematic of the utilization device or/and logic of FIGURE 1.

According to the invention, a single axis gyroscope which may be utilized in an autopilot system for control of an aircraft has the novel testing arrangement applied thereto. A signal providing device or signal generator is at one end of the sensitive axis of the gyroscope and at the other end of this axis there is located a torque motor for precessing the gyroscope.

When the output of such a signal generator is applied in feedback relation to the torque motor, the gyroscope functions as a rate gyroscope. Such torque motor may also be energized from another source to cause precessing of the gyroscope.

As stated above, the gyroscope may be of the type as disclosed in the patent to Johnson et al. 3,060,752 or Jarosh et al. 2,752,791. Thus the gyroscope, repeating, is provided with a pick-off or signal generator and also a torque motor. Additionally, in the present instance, the gyroscope rotor is provided with magnetic inserts which coact with an associated electrical winding whereby a voltage is developed in the winding when the gyroscope rotor is rotating or operating. Additional means are provided for energizing the torque motor winding resulting in an output from the pick-off. When the output is applied to a logic device such as an "and" logic circuit the output from the "and" circuit will indicate whether the gyroscope is operating properly both as to the rotation of its rotor and also the freedom of the gyroscope to precess about its sensitive axis.

Returning to the block diagram of FIGURE 1, a gyroscope 10 which includes a rotor spin axis and a sensitive axis or sensing axis is connected for energization of its rotor and its inductive pick-off through a conductor 11 to a 400 cycle A.-C. supply. The gyroscope rotor is provided as stated with four circumferentially spaced magnetic inserts which coact with an associated winding to induce therein under normal operating speeds of the rotor a 1600-cycle per second voltage. This voltage is supplied through conductor 12 to a spinmotor rotation detector 14. The output from the spinmotor rotation detector 14 is supplied through conductor 16 to an "and" logic circuit 17, to be described.

The torque motor of the gyroscope is connected for energization through conductor 20 to a 75-cycle per second oscillator 21. Additionally the torquer is connected through a conductor 22 to a 20-volt D.-C. torquer excitation source (not shown).

The gyroscope includes an inductive A.-C. pick-off which in normal position of the gyroscope has no electrical signal developed therein. However, upon the energization of the torque motor and the resulting oscillatory precession of the gyroscope about its sensitive axis, a 75 cycle oscillatory signal is developed in the pick-off which is applied through conductor 23 to an amplifier demodulator 24. The output of the amplifier demodulator 24 is supplied through conductor 25, conductor 26 to a set of normally open relay contacts 28 of a K–1 relay. The relay contacts as stated are normally open. The output from conductor 25 is also supplied over conductor 27 to a 75-cycle per second band pass amplifier 29 having its output in turn connected to conductor 30 to the "and" logic circuit 17. When the proper outputs are both as to polarity or phase and magnitude being provided over conductors 16 and 30 to the "and" circuit 17, relay operating winding 32 which is connected through conductor 31 to the "and" circuit 17 will be energized and the K–1 relay will operate closing contacts 28 and thereby supply the output to a utilization device such as an automatic pilot for an aircraft. The closing of relay contacts 28 enables the output from the pickoff of gyroscope 10, due to a change in a condition being sensed by the gyroscope and causing its precession about its sensitive axis, to be transmitted for control purposes to the automatic pilot or condition control system.

Reviewing FIGURE 1, the gyro spin rotor has 400 cycles per second A.-C. voltage applied thereto and also the pick-off has 400-cycle per second A.-C. voltage applied thereto. The gyro rotor has equally circularly spaced four magnetic inserts related to a winding so that at normal full rotor operating speeds, a 1600-cycle per second voltage is developed in the winding. This voltage is applied to the spinmotor rotation detector 14 and thence to the "and" circuit 17. The gyro torquer is connected to the plus 28 volt D.-C. source and the 75-cycle per second oscillator 21 so that the output on conductor 23 is a modulated voltage of 475-cycles per second and 325-cycles per second of the 400-cycle carrier due to the 75 cps. input to the torquer. The amplifier demodulator 24 eliminates the 400-cycle carrier signal that energizes the pick-off winding so that conductor 27 has 75 c.p.s. voltages due to the precession of the gyroscope by the torque motor thereon which are applied to the filter 29. The output of the filter 29 passes to the "and" circuit so that when proper inputs are supplied to the "and" circuit 17 the relay K–1 is energized.

Continuing to FIGURE 2 for details of the band pass filter 29 and the "and" logic 17, the conductor 27 (FIGURE 1) is connected to the band pass filter amplifier 29 (FIGURE 2). The 75 c.p.s. voltage on conductor 27 supplies an input through a lag arrangement 33 to a unity gain amplifier section 34 having the transistor 35 of the NPN-type. The lag arrangement 33 is connected to the transistor base. The output from section 34 is supplied to a high gain section 36 having the NPN transistor 37. The output of section 36 is coupled through resistor 39 and a further input circuit 40 to a high gain section 41 having a transistor 42. The output from section 41 is supplied through an input circuit 43 to a unity gain section 47 having the transistor 44. The output from section 47 (FIGURE 2) is applied through conductor 48 (FIGURES 2 and 3) and through a half wave rectifier arrangement 50 to a conductor 60 connected to the base of a transistor 61 in "and" logic 17. Logic 17 in FIGURE 3 is within the dashed lines.

The second input to the "and" logic 17 derived from rotation of the gyro rotor is supplied over conductor 12 through a half wave rectifier-amplifier section 51 and thence through a diode 52 and resistor 54 to the base of a transistor 56. The arrangement is such that upon conduction of transistors 56 and 61 current passes through the winding 32 of the K–1 relay closing the relay contacts 28. The resistor 54 and capacitor 53 form a lag network and their valves are so related and their time constant is of such value that if the spinmotor rotation is for example between 80–200 revolutions per second the diode 56 will be non-conducting and the relay winding 32 will not be energized. Consequently, the rotor of the gyro 10 must not only be rotating but must be rotating above 200 r.p.s. or the relay winding will be deenergized.

In other words, if the rotation of the gyro spin rotor is fast enough the capacitor 53, FIGURE 2, will have a charge maintained thereon sufficient so that what leaks off will be compensated by additional charge from rotation of the rotor to keep transistor 56 conducting. However, if the spin rate of the gyro rotor falls off sufficiently, the charge on capacitor 53 will leak off, and its charge will decrease so that it will be an insufficient voltage applied to the base of transistor 56 to maintain conducting and thus the circuit through the relay winding 32 will be interrupted.

It will be thus seen from the above that there has been provided a novel gyro operation monitor which senses while in-flight both the output from the gyro pick-off due to the dithering or slight oscillations applied to the gyro by energization of the torquer and thus to the proper operation of the sensitive axis of the gyroscope but also includes provisions for detecting the proper operation speed of the gyro rotor which speed is necessary for proper rigidity of the gyro. Thus a failure on either conductor 25 indicating no movement of the sensitive axis or on conductor 16 indicating non-rotation of the rotor will prevent operation of the logic 17.

While many changes could be made in the above construction and other embodiments of this invention could be made without departing from the scope thereof, it is intended that all matter contained in the above description or shown in the accompanying drawings shall be interpreted as illustrative and not in a limiting sense.

What is claimed is:

1. An in-flight gyroscope monitor for a gyroscope having a signal pick-off responsive to a change in a condition and said gyroscope also having a torquer for effecting further operation of the pick-off, comprising: means for energizing said torquer in opposite directions to effect oscillations of the pick-off and thus provide an oscillatory signal from the pick-off in addition to the signal therein provided by the change in the condition; means filtering the oscillatory signal from the signal due to normal response of the gyroscope due to the change in the condition; and utilization means responsive to the filtered signal.

2. The apparatus of claim 1, a gyroscope spinmotor velocity detection means providing a signal; and means responsive to said signal and also operating said utilization device.

3. The apparatus of claim 2, wherein said utilization device is an "and" logic, and an output member operated by said "and" logic device when the effects thereon due to the oscillations of the gyroscope and the rotation of the gyroscope spinmotor are alike.

4. A tester for use with a gyroscope having an electrical signal generator providing a signal due to a change in a condition and an electrical torque motor for effecting rotation of the gyroscope about its sensitive axis thus causing additional operation of the signal generator, said tester comprising: means for energizing said torquer in opposite directions to effect oscillations of the signal generator and thus provide an oscillatory signal therefrom; means for filtering the oscillatory electrical signal from the signal due to normal response of the gyroscope due to change in the condition; and a utilization means responsive to such filtered signal.

5. The apparatus of claim 4, an electrical signal generating means responsive to the rotational velocity of the gyroscope spinmotor, and means including said utilization means operated by the generated voltage.

6. In a system for testing a gyroscope rotatable about an axis upon change in a condition, said gyroscope having a first signal generator developing a signal in response to such rotation of said gyroscope and including a torque motor to effect further rotation of the gyroscope about said axis; a test circuit connected to the torque motor; means for applying an alternating voltage to the test circuit; further means transmitting only signals from the signal generator due to energization of said test circuit; and utilization means connected to said further means.

7. The apparatus of claim 6, additional means developing a second signal having a magnitude dependent on the rotational velocity of a spinmotor of said gyroscope;

and means connecting the additional means to the utilization means.

8. The system as claimed to claim 6 wherein the signal generator is of the inductive type having one winding energized from an alternating voltage source and wherein the voltage induced in the second winding is in accordance with the rotation of said gyroscope due to change in the condition.

9. The apparatus of claim 7 wherein the utilization means is an "and" logic device which becomes ineffective when the second signal from the additional means is substantially less than the normal magnitude of the second signal.

References Cited by the Examiner

UNITED STATES PATENTS

| | | |
|---|---|---|
| 678,236 | 7/1901 | Fish. |
| 2,564,010 | 8/1951 | Jacobs. |
| 2,824,296 | 2/1958 | Hecht et al. _____ 340—253 |
| 2,968,956 | 1/1961 | Agins _____ 33—226 X |
| 3,146,433 | 8/1964 | Hurlburt _____ 340—263 |
| 3,150,294 | 9/1964 | Dastidar _____ 340—213 |
| 3,241,555 | 4/1966 | McLean _____ 73—1 |

LOUIS R. PRINCE, *Primary Examiner.*